US012222497B2

(12) United States Patent
Kabe et al.

(10) Patent No.: US 12,222,497 B2
(45) Date of Patent: Feb. 11, 2025

(54) DISPLAY DEVICE

(71) Applicant: Japan Display Inc., Tokyo (JP)

(72) Inventors: Masaaki Kabe, Tokyo (JP); Takeo Koito, Tokyo (JP); Chikyu Nakaoka, Tokyo (JP)

(73) Assignee: Japan Display Inc., Tokyo (JP)

( * ) Notice: Subject to any disclaimer, the term of this patent is extended or adjusted under 35 U.S.C. 154(b) by 639 days.

(21) Appl. No.: 17/400,261

(22) Filed: Aug. 12, 2021

(65) Prior Publication Data

US 2021/0373329 A1 Dec. 2, 2021

Related U.S. Application Data

(63) Continuation of application No. PCT/JP2020/004412, filed on Feb. 5, 2020.

(30) Foreign Application Priority Data

Feb. 12, 2019 (JP) .................... 2019-022752

(51) Int. Cl.
*G02B 27/01* (2006.01)
*H04N 13/351* (2018.01)
*H04N 13/363* (2018.01)

(52) U.S. Cl.
CPC ....... *G02B 27/0101* (2013.01); *H04N 13/351* (2018.05); *H04N 13/363* (2018.05);
(Continued)

(58) Field of Classification Search
CPC ..... G02B 2027/0105–0198; G02B 27/00–648; G02B 27/01–0189;
(Continued)

(56) References Cited

U.S. PATENT DOCUMENTS

2011/0157326 A1 6/2011 Karaoguz et al.
2015/0264341 A1 9/2015 Seshadri et al.
(Continued)

FOREIGN PATENT DOCUMENTS

JP 2001251403 A 9/2001
JP 2018202927 A 12/2018
(Continued)

OTHER PUBLICATIONS

International Search Report mailed Apr. 7, 2020 in Application No. PCT/JP2020/004412.
(Continued)

*Primary Examiner* — Bao-Luan Q Le
*Assistant Examiner* — Christopher A Lamb, II
(74) *Attorney, Agent, or Firm* — K&L Gates LLP

(57) ABSTRACT

According to one embodiment, a display device includes a display area, a light control element, a projection surface and at least one of one or more mirrors or one or more lenses. The display area includes subpixels, and includes a first area containing first subpixels in the subpixels and a second area containing second subpixels in the subpixels. The light control element is overlapped with the first area. The projection surface projects an image displayed in the display area. A virtual image perceived by a user who views the projection surface includes a first virtual image corresponding to the first area and perceived as a stereoscopic virtual image, and a second virtual image corresponding to the second area and perceived as a planar virtual image.

8 Claims, 11 Drawing Sheets

(52) U.S. Cl.
CPC ............... *G02B 2027/0118* (2013.01); *G02B 2027/0134* (2013.01)

(58) Field of Classification Search
CPC .......... B60K 2370/00; B60K 35/00–90; H04N 13/00–398
See application file for complete search history.

(56) References Cited

U.S. PATENT DOCUMENTS

| | | | |
|---|---|---|---|
| 2017/0230628 A1* | 8/2017 | Ichikawa | ................ G06T 5/00 |
| 2018/0157036 A1* | 6/2018 | Choi | .................... G06T 19/006 |
| 2019/0064515 A1* | 2/2019 | Wei | .................. G02F 1/133512 |
| 2019/0096121 A1 | 3/2019 | Kang et al. | |
| 2020/0074896 A1 | 3/2020 | Kusafuka et al. | |
| 2020/0228791 A1 | 7/2020 | Kusafuka et al. | |

FOREIGN PATENT DOCUMENTS

| | | | |
|---|---|---|---|
| JP | 2019015823 A | 1/2019 | |
| JP | 2019062532 A | 4/2019 | |
| WO | 2014136610 A1 | 9/2014 | |
| WO | 2019225400 A1 | 11/2019 | |

OTHER PUBLICATIONS

Japanese Office Action issued Feb. 21, 2023 in corresponding Japanese Application No. 2019-022752.
Translation of Chinese Office Action issued Jan. 11, 2024 in corresponding Chinese Patent Application No. 202080013733.2. 10 pages.

\* cited by examiner

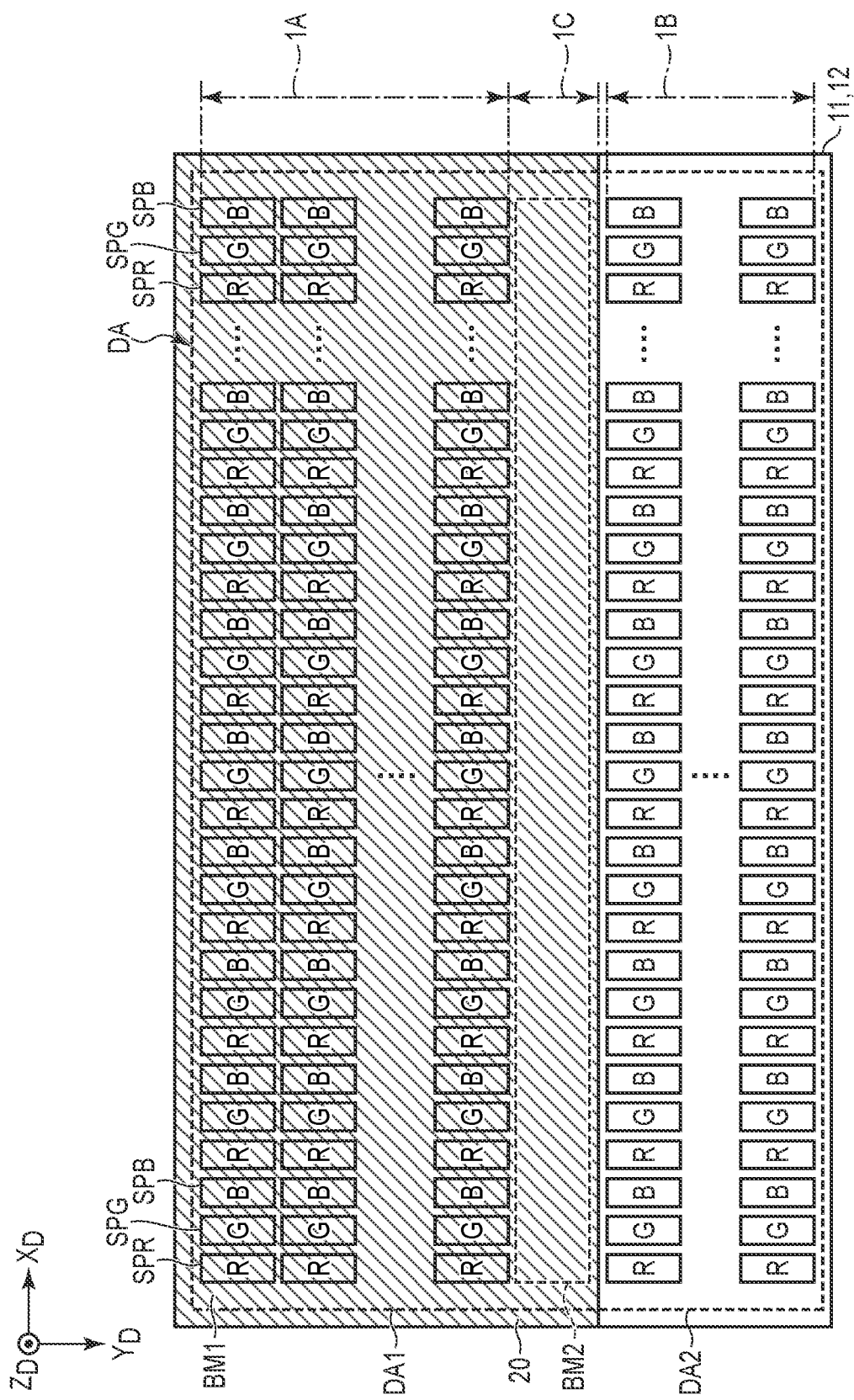
F I G. 5

DISPLAY DEVICE

CROSS-REFERENCE TO RELATED APPLICATIONS

This application is a Continuation Application of PCT Application No. PCT/JP2020/004412, filed Feb. 5, 2020 and based upon and claiming the benefit of priority from Japanese Patent Application No. 2019-022752, filed Feb. 12, 2019, the entire contents of all of which are incorporated herein by reference.

FIELD

Embodiments described herein relate generally to a display device.

BACKGROUND

In recent years, head up displays (HUDs), which displays information within a sight of a driver by reflecting an image on a projection surface of a car such as a windshield, become widely used. The driver perceives a virtual image of the HUD in, for example, a position four meters ahead from the windshield. Thereby, the driver can recognize route guidance, emergency information, and the like without widely changing the line of sight, and thus, the safety in driving is improved.

An HUD may include a display device that is capable of displaying a three-dimensional image. In order to make a user (viewer) perceive a three-dimensional image, an image for right eye must be perceived by the right eye of the user, and an image for left eye must be perceived by the left eye of the user. As a method to achieve the above, for example, there are a method in which a user wears special eyeglasses such as polarizer eyeglasses, shutter eyeglasses, or the like, and a method in which a light control element such as barrier, lenticular lens, or the like is provided with the display device.

In a case where the display device, which is capable of displaying a three-dimensional image, is provided with a HUD in a vehicle, a method in which a light control element is provided with the display device is preferred in order to prevent a driver from wearing eyeglasses etc., which may cause a trouble in driving.

However, in the method in which a light control element is provided with the display device, the resolution of a virtual image to be perceived by the user may be deteriorated.

SUMMARY

The present application generally relates to a display device.

According to one embodiment, a display device includes a display area, a light control element, a projection surface and at least one of one or more mirrors or one or more lenses. The display area includes subpixels, and includes a first area containing first subpixels in the subpixels and a second area containing second subpixels in the subpixels. The light control element is overlapped with the first area. The projection surface projects an image displayed in the display area. A virtual image perceived by a user who views the projection surface includes a first virtual image corresponding to the first area and perceived as a stereoscopic virtual image, and a second virtual image corresponding to the second area and perceived as a planar virtual image.

BRIEF DESCRIPTION OF THE DRAWINGS

FIG. 5 is a plan view showing another structure example of the display panel and the light control element in the display of FIG. 3.

DETAILED DESCRIPTION

Figure 1:
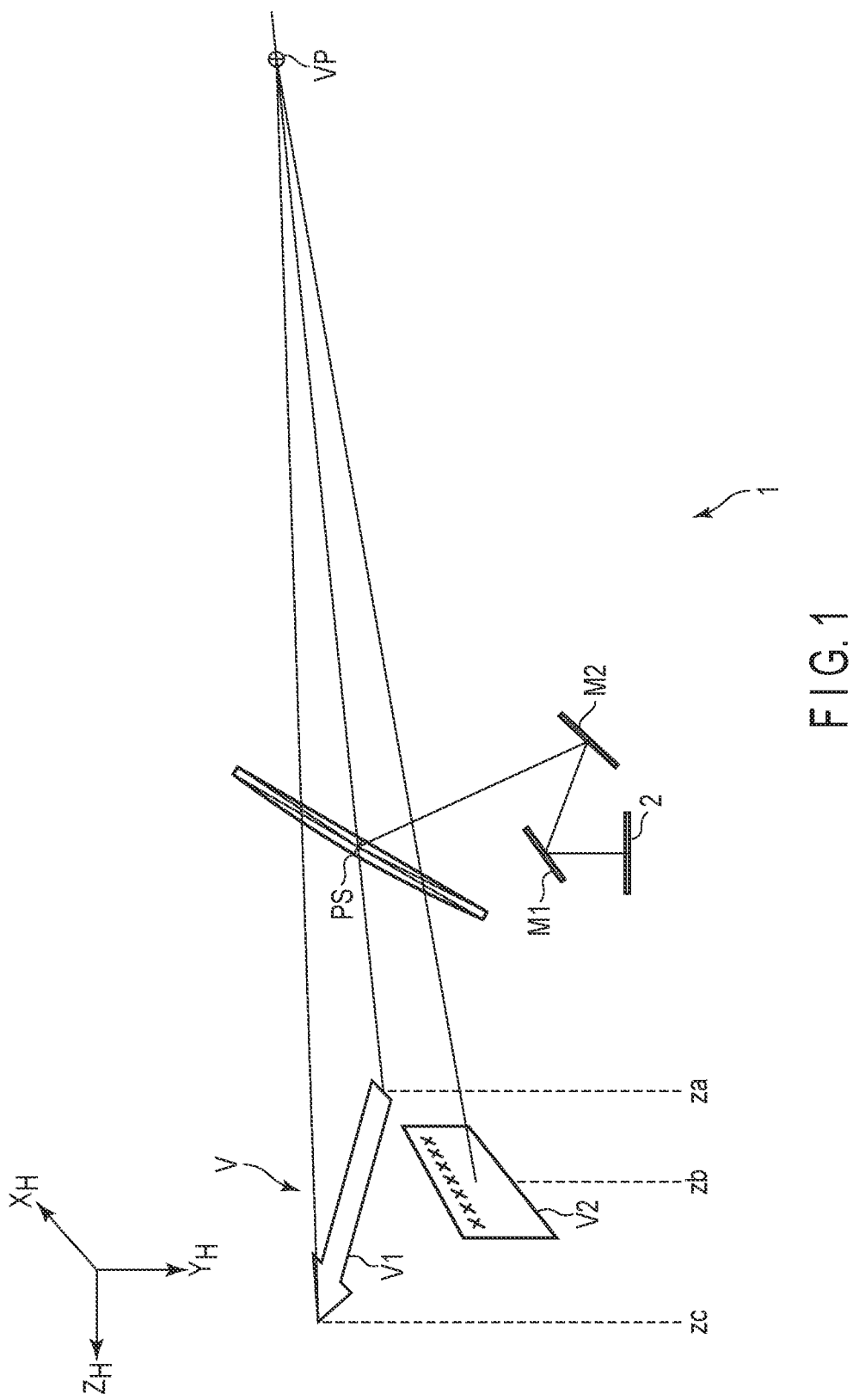
FIG. 1 is a schematic view of a display device according to an embodiment.

In general, according to one embodiment, a display device includes a display area, a light control element, a projection surface and at least one of one or more mirrors or one or more lenses for projecting the image on the projection surface. The display area includes subpixels arranged in a first direction and a second direction which is orthogonal to the first direction, and includes a first area containing first subpixels in the subpixels and a second area containing second subpixels in the subpixels. The light control element is overlapped with the first area. The projection surface projects an image displayed in the display area. A virtual image perceived by a user who views the projection surface includes a first virtual image corresponding to the first area and perceived as a stereoscopic virtual image, and a second virtual image corresponding to the second area and perceived as a planar virtual image.

According to another embodiment, a display device includes a first display area and a second display area having pixels arranged in a matrix, a light control element and a projection surface. The light control element displays a three-dimensional image, being overlapped with the first display area and not overlapped with the second display area. The projection surface projects the three-dimensional image displayed on the first display area and a two-dimensional image displayed on the second display area.

Embodiments will be described hereinafter with reference to the accompanying drawings. The disclosure is merely an example, and proper changes within the spirit of the invention, which are easily conceivable by a skilled person, are included in the scope of the invention. In addition, in some cases, in order to make the description clearer, the widths, thicknesses, shapes, etc., of the respective parts are schematically illustrated in the drawings, compared to the actual modes. The schematic illustration is merely an example, and adds no restrictions to the interpretation of the invention. Furthermore, in the specification and drawings, the same elements as those described in connection with preceding drawings are denoted by like reference numerals, and a detailed description thereof may be omitted.

FIG. 1 is a schematic view of a display device according to an embodiment. The display device is, for example, a head up display (HUD) 1. HUD 1 projects an image on a projection surface to form a virtual image to be perceived by a user.

As in FIG. 1, in a coordinate system defined to explain the structure of the display device, direction $X_H$ and direction $Y_H$ are orthogonal to each other, and direction $Z_H$ is orthogonal to both the directions $X_H$ and $Y_H$. Direction $X_H$ corresponds to a horizontal direction with respect to a view point VP of a user, direction $Y_H$ corresponds to a vertical direction with respect to the view point VP, and direction $Z_H$ corresponds to a depth direction with respect to the view point VP. Furthermore, observing $X_H$-$Y_H$ plan defined by the directions $X_H$ and $Y_H$ from the view point VP may be referred to as a plan view.

The HUD 1 includes a display 2, one or more mirrors M1 and M2, and projection surface PS. The display 2 is configured to display an image based on a display signal acquired or generated by the display 2 on a screen. The mirrors M1 and M2 are, for example, a flat mirror M1 and a concave mirror M2.

An image displayed on the screen of the display 2 is projected onto the projection surface PS via the flat mirror M1 and the concave mirror M2. Specifically, optical beam of the displayed image is reflected by and condensed by the flat mirror M1 and the concave mirror M2 to be projected onto the projection surface PS. The concave mirror M2 has, for example, a radius of curvature in the vertical direction of 730 mm, and can reflect the optical beam in a manner to enlarge an image.

The projection surface PS is, for example, an inner surface of a windshield of a car, and has, for example, a radius of curvature in the horizontal direction of 1700 mm. The projected image is reflected by the projection surface PS to a side of a user (driver) who has a view point VP. The projected image forms a virtual image V in a position more distant than the projection surface PS with respect to the user (for example, a position a few meters ahead from the projection surface PS). That is, the user perceives the virtual image V in a position more distant than the projection surface PS.

The one or more mirrors M1 and M2 of the HUD 1 may be two concave mirrors. Or, instead of the flat mirror and the concave mirror, other optical members including a half mirror, Fresnel mirror, and the like can be adopted. Instead of the one or more mirrors M1 and M2, or in addition to the one or more mirrors M1 and M2, one or more lenses may be used. Furthermore, the projection surface PS may not be a windshield, but may be a transparent reflective plate disposed in front of the driver. The image displayed on the screen of the display 2 is reflected and condensed by the flat mirror M1 and the concave mirror M2 to be projected onto the reflection plate.

The display 2 can display a three-dimensional image and a two-dimensional image. A state where the display 2 can display a three-dimensional image is a state where a plurality of images corresponding to a plurality of view points are displayed on the display 2 such that a user seeing the display 2 can perceive a three-dimensional image by capturing images of two view points by both eyes.

In order to display a three-dimensional image, a light control element such as barrier, lenticular lens, or the like is disposed in a part of the screen of the display 2. The light control element controls the light beam emitted from the display 2 such that a pixel group for right eye displayed on the screen of the display 2 is perceived by the right eye of the user, and a pixel group for left eye displayed on the screen is perceived by the left eye of the user. In this manner, the user can perceive the three-dimensional image.

If a three-dimensional image is displayed by the display 2 to be projected onto the projection surface PS via the mirrors M1 and M2, a virtual image V1 to be perceived by a user as a three-dimensional image is formed. On the other hand, if a two-dimensional image is displayed by the display 2 to be projected onto the projection surface PS via the mirrors M1 and M2, a virtual image V2 to be perceived by a user as a two-dimensional image is formed. The virtual image V2 is formed as a plane parallel to the $X_H$-$Y_H$ plane, for example.

For example, as in FIG. 1, the virtual image V1 corresponding to a three-dimensional image is perceived by a user in a range between a depth position za and a depth position zc with respect to the view point VP. Furthermore, the virtual image V2 corresponding to a two-dimensional image is perceived by a user in a predetermined depth position zb with respect to the view point VP. Thus, the user can perceive the virtual image V1 as a stereoscopic virtual image and the virtual image V2 as a planar virtual image.

FIG. 1 illustrates an example where the depth position zb in which the virtual image V2 is perceived is within a range between the depth position za and the depth position zc in which the virtual image V1 is perceived; however, the depth position zb may be closer to the view point VP of the user than the range (that is, a position before the depth position za), or may be deeper than the depth position zc.

Note that, in a display with a light control element (that is, a display in which a light control element is overlapping with a display panel), the resolution of an image perceived by a user becomes lower than the resolution of the display. For example, if images of two view points for the right and left eyes are displayed on the display, the resolution of the image perceived by the user is half the resolution of the display.

However, for example, in a HUD disposed in a car, information in which deterioration in visibility, that is, deterioration in resolution is not preferable may be displayed. The information is desired to be displayed in resolution as high as possible, preferably.

Therefore, in the present embodiment, the display 2 is configured to include a first area for a three-dimensional display in which a light control element is overlaid and a second area in which a light control element is not overlaid. For example, an image which is preferred to be displayed with a deepness is displayed in the first area, and an image in which deterioration in resolution is not preferable is displayed in the second area. The user viewing the projection surface PS perceive a stereoscopic virtual image corresponding the image displayed in the first area, and also a planer virtual image corresponding the image displayed in the second area. Thus, the display quality of the virtual image to be perceived by users can be improved.

Figure 2:
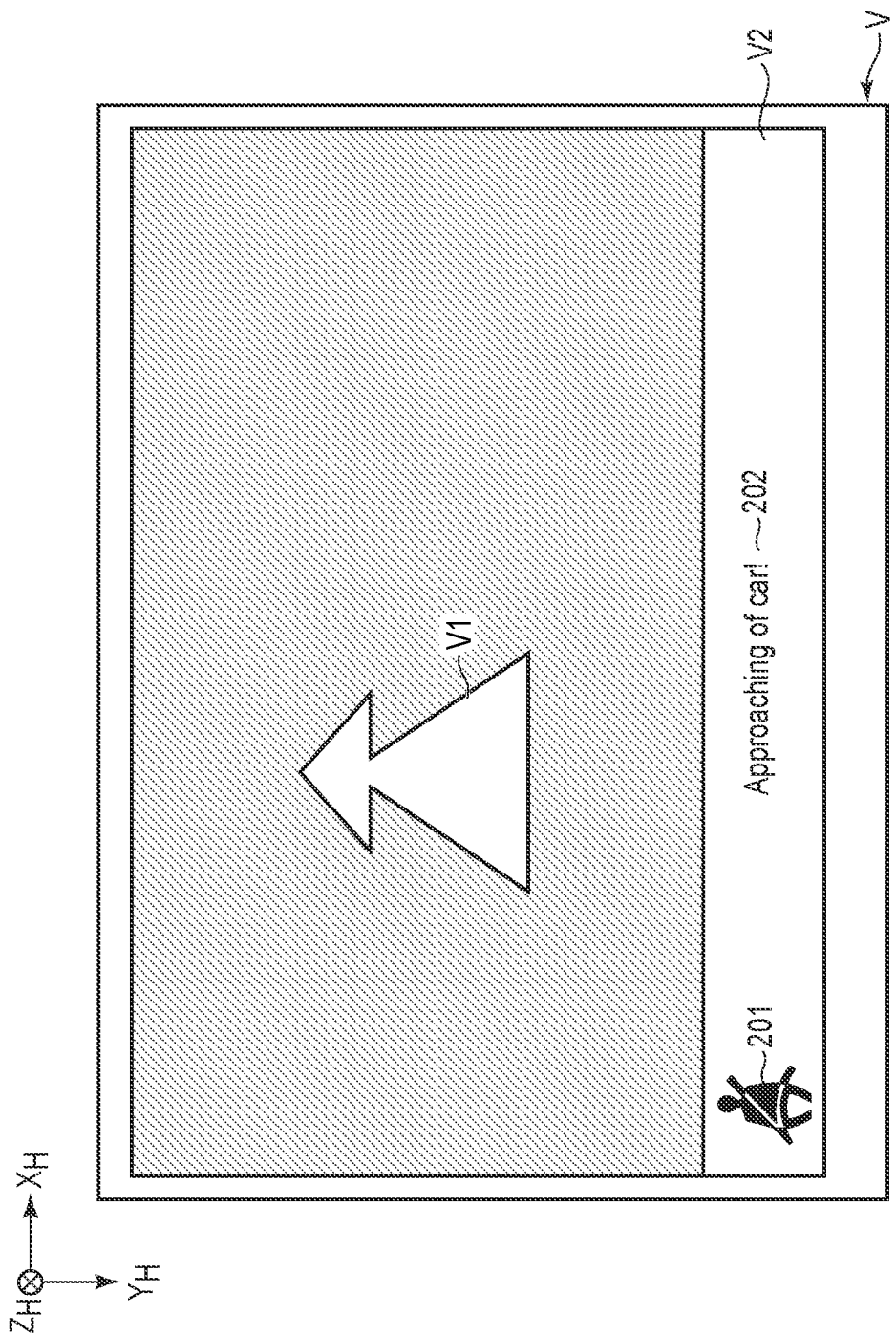
FIG. 2 is a view showing an example of a virtual image formed by the display device of the embodiment.

FIG. 2 shows an example of the virtual image V which is perceived by a user at the view point VP. In the virtual image V, an image which is preferred to be displayed with a certain deepness (an arrow in this example) is displayed is formed as a virtual image V1 in a three-dimensional manner, and an image in which deterioration in resolution is not preferable or an image which is not necessary to be formed in a three-dimensional manner is formed as a virtual image V2 in a two-dimensional manner. The image in which deterioration in resolution is not preferable is, for example, an image including a character, symbol, mark, sign (for example, road sign), visibility of which is lowered if the resolution is deteriorated. As in FIG. 2, a mark 201 which recommends a user to wear the seatbelt, and a character string 202 which warns approaching of another car to a user are images in which deterioration in resolution is not preferable, and are formed as virtual images V2 in a two-dimensional manner, by which the resolution does not deteriorate.

In the virtual image V, the virtual image V1 formed in a three-dimensional manner may be arranged in the upper part with respect to the user, and the virtual image V2 formed in a two-dimensional manner may be arranged in the lower part with respect to the user. Drivers tend to move their eye sights to the upper part of the windshield (projection surface PS) to look in a distance and to the lower part of the windshield to look in the proximity. The feature in which the virtual images V2 to be formed closer than the virtual image V1 are arranged in the lower part of the virtual image V1 is suitable for such tendency.

Figure 3:
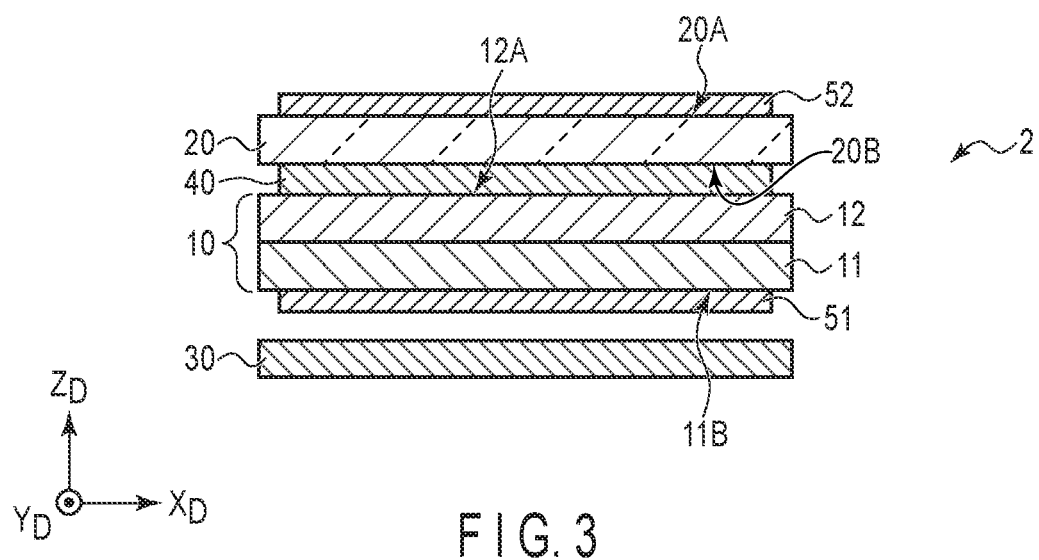
FIG. 3 is a cross-sectional view showing a structure example of a display provided with the display device of the embodiment.

FIG. 3 is a cross-sectional view of an example of the structure of the display 2. In the coordinate system defined to explain the structure of the display 2, direction $X_D$ and direction $Y_D$ are orthogonal to each other, and direction $Z_D$ is orthogonal to the directions $X_D$ and $Y_D$. Directions $X_D$ and $Y_D$ are parallel to the main surface of the substrate of the display 2, and direction $Z_D$ is orthogonal to the main surface. That is, direction $Z_D$ corresponds to the thickness direction of the display 2.

The display 2 includes a display panel 10, light control element 20, and lighting device 30. The display panel 10 is, for example, a liquid crystal panel. The display panel 10 includes a first substrate 11 and a second substrate 12. The second substrate 12 is positioned above the first substrate 11. Note that, in this example, a direction from the first substrate 11 to the second substrate 12 will be referred to as upper part (or above), and a direction from the second substrate 12 to the first substrate 11 will be referred to as lower part (or below). Phrases such as "the second member above the first member" and "the second member below the first member" may be interpreted as the second member contacting the first member, or as the second member being apart from the first member.

The light control element 20 is positioned above the display panel 10. The light control element 20 includes a plurality of light controllers as will be described later. The light control element 20 is fixed to the display panel 10 with a transparent resin 40.

The lighting device 30 is positioned below the display panel 10. A first polarizer 51 is adhered to a lower surface 11B of the first substrate 11. A second polarizer 52 is adhered to an upper surface 20A of the light control element 20. The second polarizer 52 may be adhered to the upper surface 12A of the second substrate 12, or may be adhered to the lower surface 20B of the light control element 20. Furthermore, the light control element 20 may be positioned between the first polarizer 51 and the first substrate 11, or between the lighting device 30 and the first polarizer 51. Furthermore, the light control element 20 may be built into the display panel 10.

Note that, the display panel 10 is not limited to a liquid crystal panel, but may be a self-luminous display panel including organic electroluminescence display elements or μLEDs, or may be an electronic paper display panel including electrophoretic elements, for example.

The display panel 10 is, for example, a transparent display panel which displays an image by selectively passing the light from the rear surface side of the first substrate 11. Note that, the display panel 10 may be a reflection display panel which displays an image by selectively reflecting the light from the front surface side of the second substrate 12, or may be a display panel including both the transparent display function and the reflection display function. If the display panel 10 is the reflection display panel, the lighting device 30 may be omitted, or the lighting device 30 may be positioned above the display panel 10.

Figure 4:
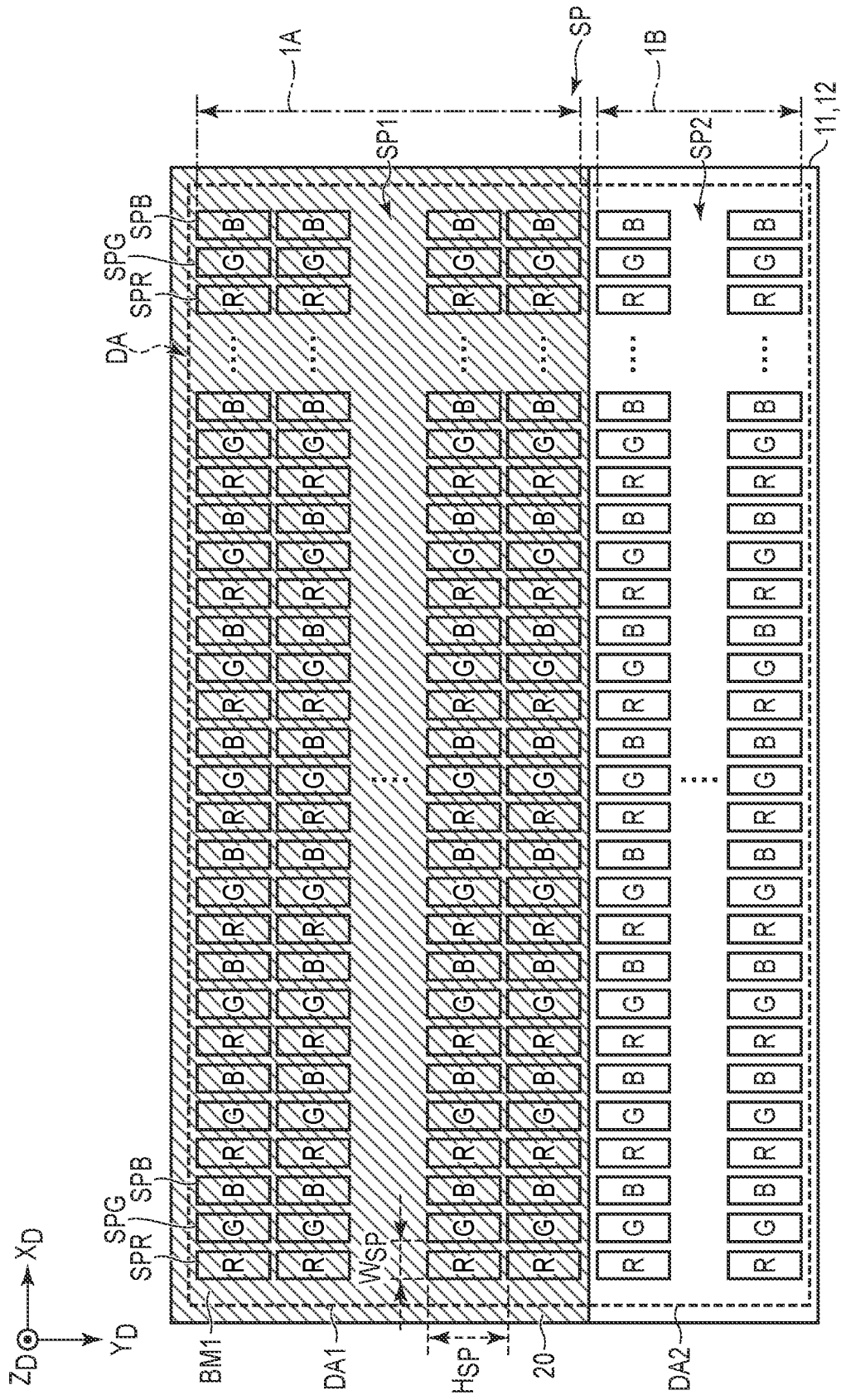
FIG. 4 is a plan view showing a structure example of a display panel and a light control element in the display of FIG. 3.

FIG. 4 is a plan view of an example of the structure of the display panel 10 and the light control element 20. The display panel 10 includes a display area DA in a part where the first substrate 11 and the second substrate 12 overlap with each other.

The display area DA includes subpixels SP which are arranged in a direction $X_D$ and a direction $Y_D$ which is orthogonal to the direction $X_D$. For example, the subpixels SP includes a red subpixel SPR displaying red, green subpixel SPG displaying green, and blue subpixel SPB displaying blue. Furthermore, in an area of the display area DA where the subpixels SP is not disposed, a light shielding member which will be referred to as black matrix BM1 is disposed. That is, the black matrix BM1 is arranged between the subpixels SP, and in the peripheral part of the surface of the display panel 10.

The black matrix should have an optical density (OD) value of three or more. The black matrix may be a light absorbing material or a light reflection material. The black matrix may be formed of a metal material of a compound containing chrome, molybdenum, or silver, or may be formed of a black resin material.

In the following description, if a color of a subpixel is not specified, one subpixel may be referred to as subpixel SP. Furthermore, the direction $X_D$ may be referred to as horizontal direction, and the direction $Y_D$ may be referred to as vertical direction. Each subpixel SP may be shaped as a rectangle of the same size. Each subpixel SP includes a width $W_{SP}$ in the direction $X_D$, and a height $H_{SP}$ in the direction $Y_D$. The height $H_{SP}$ is, for example, greater than the width $W_{SP}$. Note that, each subpixel SP is shaped as a parallelogram, and may be inclined at a specific angle with respect to the direction $Y_D$ (for example, between 4 and 16 degrees). A plurality of subpixels SP arranged in the direction $X_D$ form rows, and a plurality of subpixels SP arranged in the direction $Y_D$ form columns.

Two subpixels SP adjacent to each other in the direction $X_D$ can display different colors. Two subpixels SP adjacent to each other in the direction $Y_D$ can display a same color. In the example of FIG. 4, a plurality of subpixels of red subpixel SPR, green subpixel SPG, and blue subpixel SPB are arranged in this order in the direction $X_D$, and a plurality of subpixels SP of the same color are arranged in the direction $Y_D$.

For example, if subpixels of n colors are arranged in the direction $X_D$, and sets of n subpixels are arranged in the direction $X_D$, the height $H_{SP}$ is n times of the width $W_{SP}$. Note that, n is a natural integer of two or more. In the example of FIG. 4, n is 3. Thus, the height $H_{SP}$ is three times as the width $W_{SP}$.

The display area DA includes a first area DA1 including first subpixels SP1 in the subpixels SP, and a second area DA2 including second subpixels SP2 in the subpixels SP. The light control element 20 which is hatched in the figure overlaps with the first area DA1. On the other hand, the light control element 20 does not overlap with the second area DA2. That is, the light control element 20 overlaps with the subpixels SP1 in a range 1A while does not overlap with the subpixels SP2 in a range 1B.

The first area DA1 is used as an area to display a three-dimensional image. Thus, the first subpixels SP1 in the first area DA1 includes a plurality of subpixels to display each of a plurality of images corresponding to a plurality of view points. The second area DA2 is used as an area to display a two-dimensional image, and thus, the second subpixels SP2 in the second area DA2 is used to display an image of one view point.

Or, it may be interpreted that, in the HUD1, the first subpixels SP1 in the first area DA1 includes a plurality of subpixels displaying each of a plurality of images of a plurality of view points by which a stereoscopic virtual image V1 is perceived by a user. Furthermore, it may be interpreted that the second subpixels SP2 in the second area DA2 displays an image of one view point by which a planar virtual image V2 is perceived by a user.

Note that, as in FIG. 5, the subpixels SP1 of one or more rows in the first area DA1, which is closest to the boundary to the second area DA2 may be replaced with a black matrix BM2. That is, the display panel 10 includes the black matrices BM1 and BM2 (first light shielding member) in a third area in the first area DA1. The third area contacts the second area DA2. In a range 1C corresponding to the third area, the light control element 20 overlaps with the black matrices BM1 and BM2. Note that, the light control element 20 may include a black matrix (second light shielding member) overlapping the black matrices BM1 and BM2 in the third area.

Figure 6:
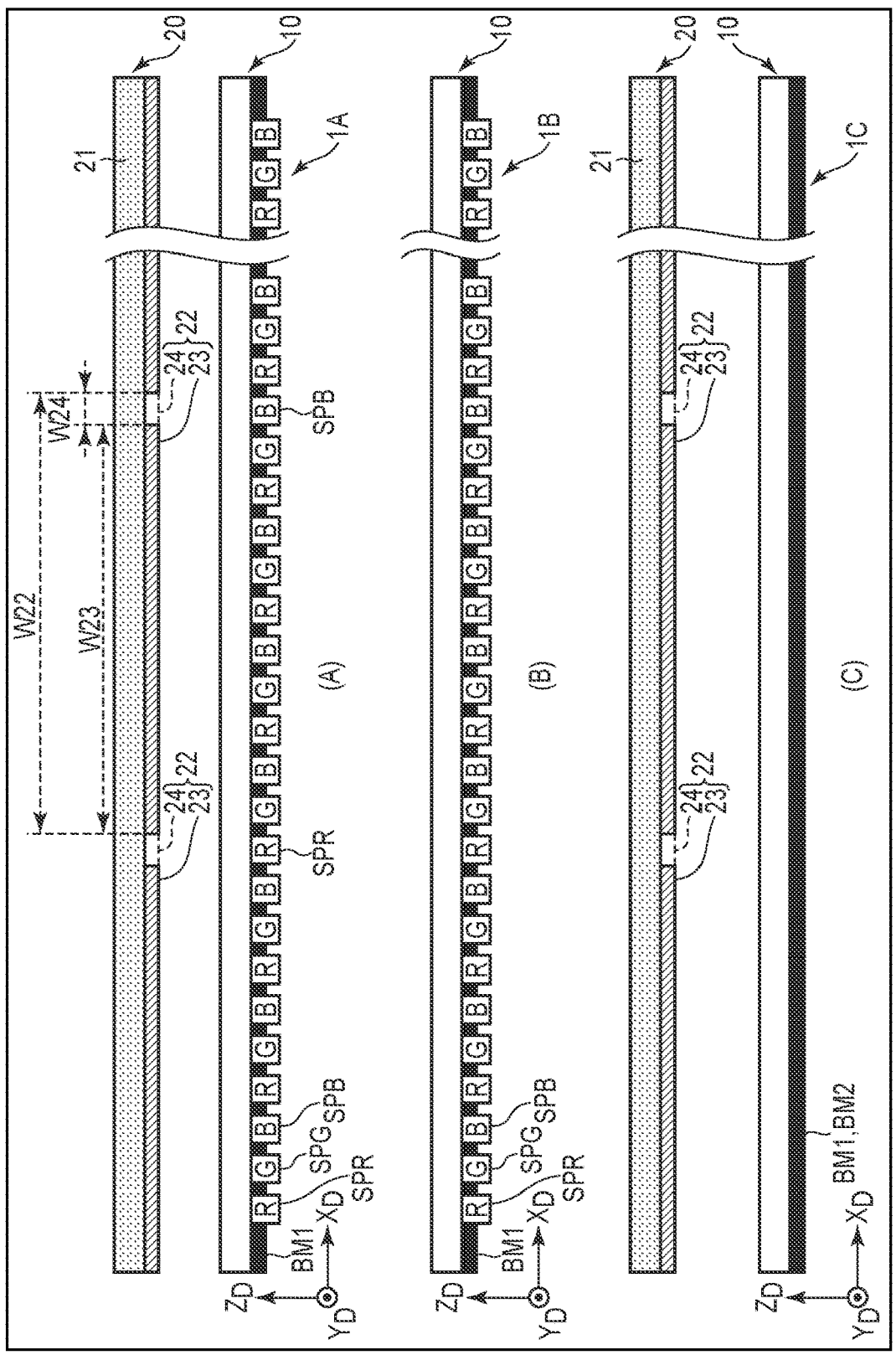
FIG. 6 is a cross-sectional view showing a structure example of the display panel and the light control element in the display of FIG. 3.

FIG. 6 is a cross-sectional view of an example of the structure of the display panel 10 and the light control element 20.

FIG. 6(A) corresponds to a cross-sectional view of a position where the first subpixels SP1 in the range 1A, wherein the light control element 20 overlaps with the display panel 10. On the upper surface of the display panel 10, the first subpixels SP1 and the black matrix BM1 are arranged. The black matrix BM1 is disposed between the subpixels and in the peripheral part of the upper surface of the display panel 10.

The light control element 20 includes a substrate 21 and a plurality of light regulating members 22. The substrate 21 is a transparent substrate such as glass, resin, or the like. The light regulating member 22 is to limit the light passing through itself, and functions as a light controller. The light regulating member 22 includes, for example, a light shielding member 23 overlapping a plurality of subpixels SP arranged in the direction $X_D$, and an opening 24 overlapping at least one of the subpixels SP. In other words, the light shielding members 23 are arranged in the direction $X_D$ at intervals each corresponding to the width of the opening 24.

The light shielding member 23 should have an optical density (OD) value of three or more. The light shielding member 23 may be a light absorbing body, or may be a light reflection body. The light shielding member 23 may be formed of a metal material of a compound containing chrome, molybdenum, or silver, or may be a black resin material. In the present embodiment, the light regulating member 22 may be, for example, an emulsion mask.

The light shielding member 23 has a width W23 in the direction $X_D$, and the opening 24 has a width W24 in the direction $X_D$. The width W22 of one light regulating member 22, that is, a pitch of the light regulating members 22 arranged in the direction $X_D$ corresponds to a sum of the widths W23 and W24.

The width W23 of the light shielding member 23 is greater than the width W24 of the opening 24. Two light regulating members 22 arranged in the direction $X_D$ overlaps with a plurality of subpixels SP. Two openings 24 adjacent to each other with a light shielding member 23 interposed therebetween overlap with, for example, subpixels SP of different colors. For example, the opening 24 positioned in the left side of FIG. 6(A) overlaps with a red subpixel SPR, and the opening 24 positioned in the right side of FIG. 6(A) overlaps with a blue subpixel SPB.

The width W24 of the opening 24 may be greater than, or equal to, or smaller than the width $W_{SP}$ of the subpixel SP. If the width W24 is smaller than the width $W_{SP}$, the number of light beams passing through the opening 24 can be decreased, and the resolution of the perceived image can be improved. On the other hand, from a stand point of suppressing the decrease of the brightness of the perceived image, the width W24 is preferred to be substantially equal to the width $W_{SP}$. Furthermore, one opening 24 may overlap with the subpixels SP.

Note that, instead of a plurality of light regulating members 22, a different kind of light controller which can control the light emitted from each subpixel SP may be provided with the light control element 20, or a plurality of lenses may be provided with the light control element 20.

FIG. 6(B) corresponds to a cross-sectional view of a position where the subpixels SP2 in the range 1B, wherein the light control element 20 does not overlap with the display panel 10. The structure of the display panel 10 is similar to that of FIG. 6(A).

FIG. 6(C) corresponds to a cross-sectional view of the range 1C, wherein the light control element 20 overlaps with the display panel 10 with the black matrices BM1 and BM2 disposed on the upper surface thereof. Note that, in the light control element 20 of the range 1C, a black matrix may be disposed instead of the light regulating member 22. Or, in the light control element 20 of the range 1C, a black matrix may be arranged instead of the light regulating member 22 without arranging the black matrix BM2 on the upper surface of the display panel 10 of the range 1C.

Note that, the part in the range 1A, wherein the light control element 20 overlaps the display panel 10 with the black matrix BM1 disposed on the upper surface thereof has the same cross-sectional view as the range 1C.

Figure 7:
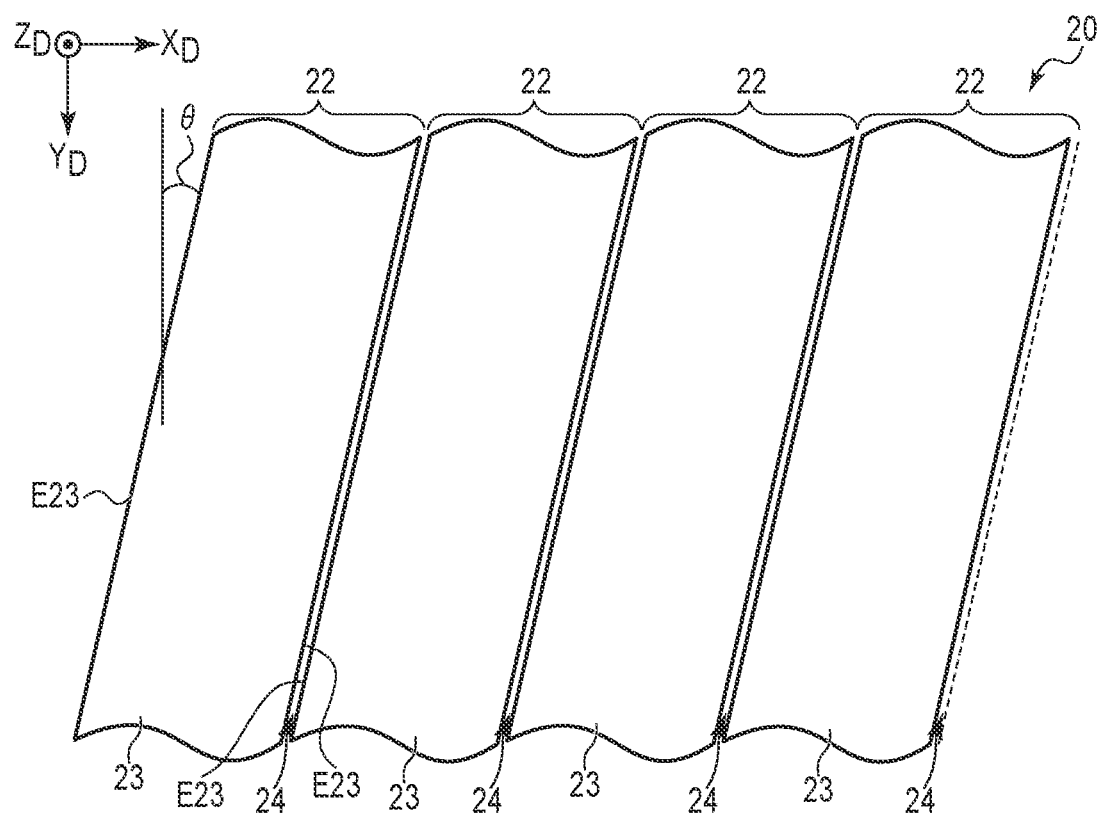
FIG. 7 is a plan view showing a structure example of the light control element in the display of FIG. 3.

FIG. 7 is a plan view of a more specific example of the structure of the light control element 20. In the light control element 20, a plurality of light regulating members 22 are arranged in the direction $X_D$. The light shielding member 23 and the opening 24 of the light regulating member 22 extend in a diagonal direction which is different from the directions $X_D$ and $Y_D$. Each light shielding member 23 has a pair of edges E23 arranged in the direction $X_D$. The edges E23 are parallel to each other. The opening 24 is positioned between the edges E23 which faces each other of the light shielding members 23 which are adjacent to each other in the direction $X_D$.

The light regulating member 22 overlaps with the display area DA and linearly extends across a plurality of rows of subpixels. Each of the light regulating member 22, light shielding member 23, and opening 24 is inclined with respect to the direction $Y_D$ at an angle θ.

Figure 9:
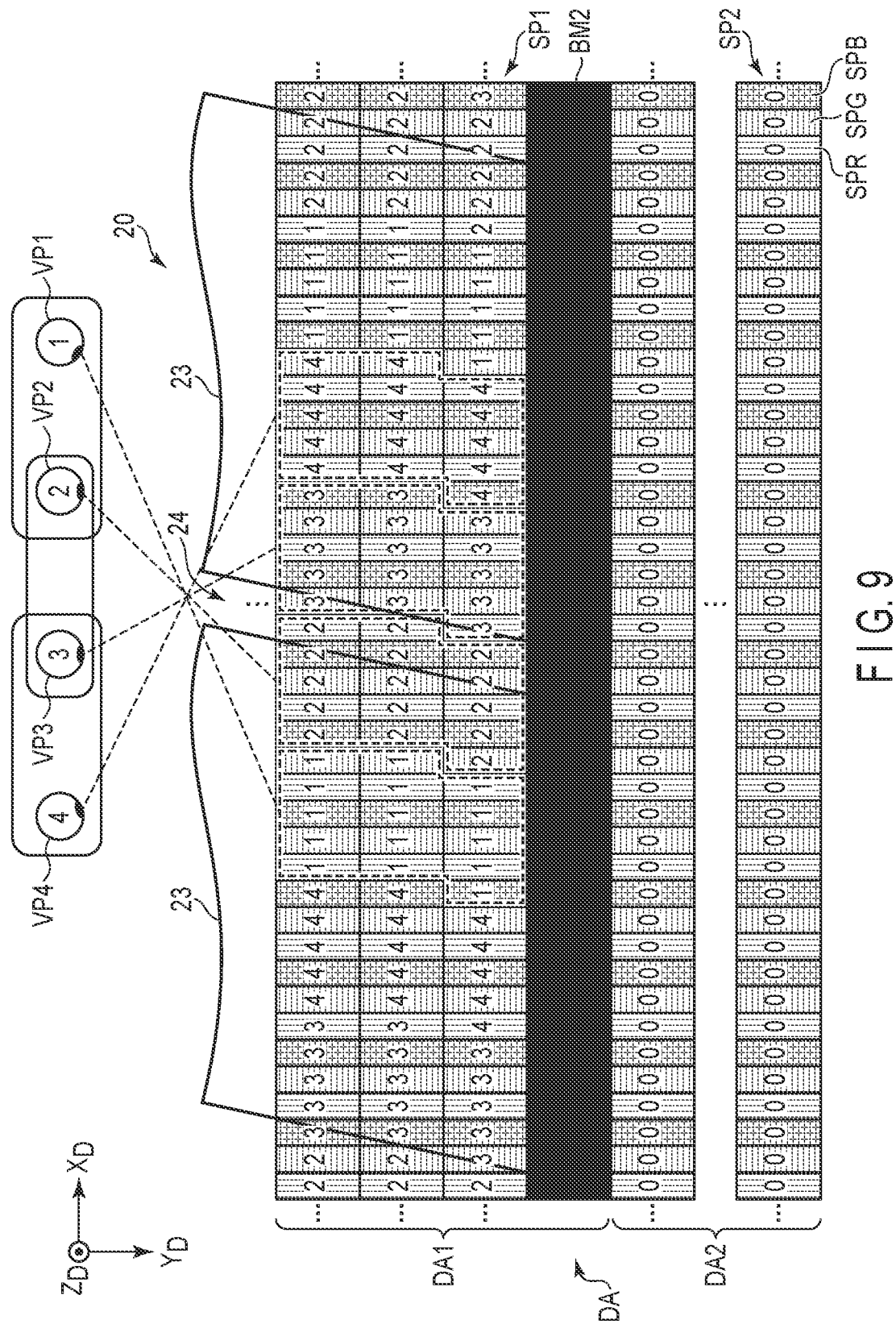
FIG. 9 is a view showing a second arrangement example of an image with respect to subpixels arranged in the display panel of the display of FIG. 3.
Figure 10:
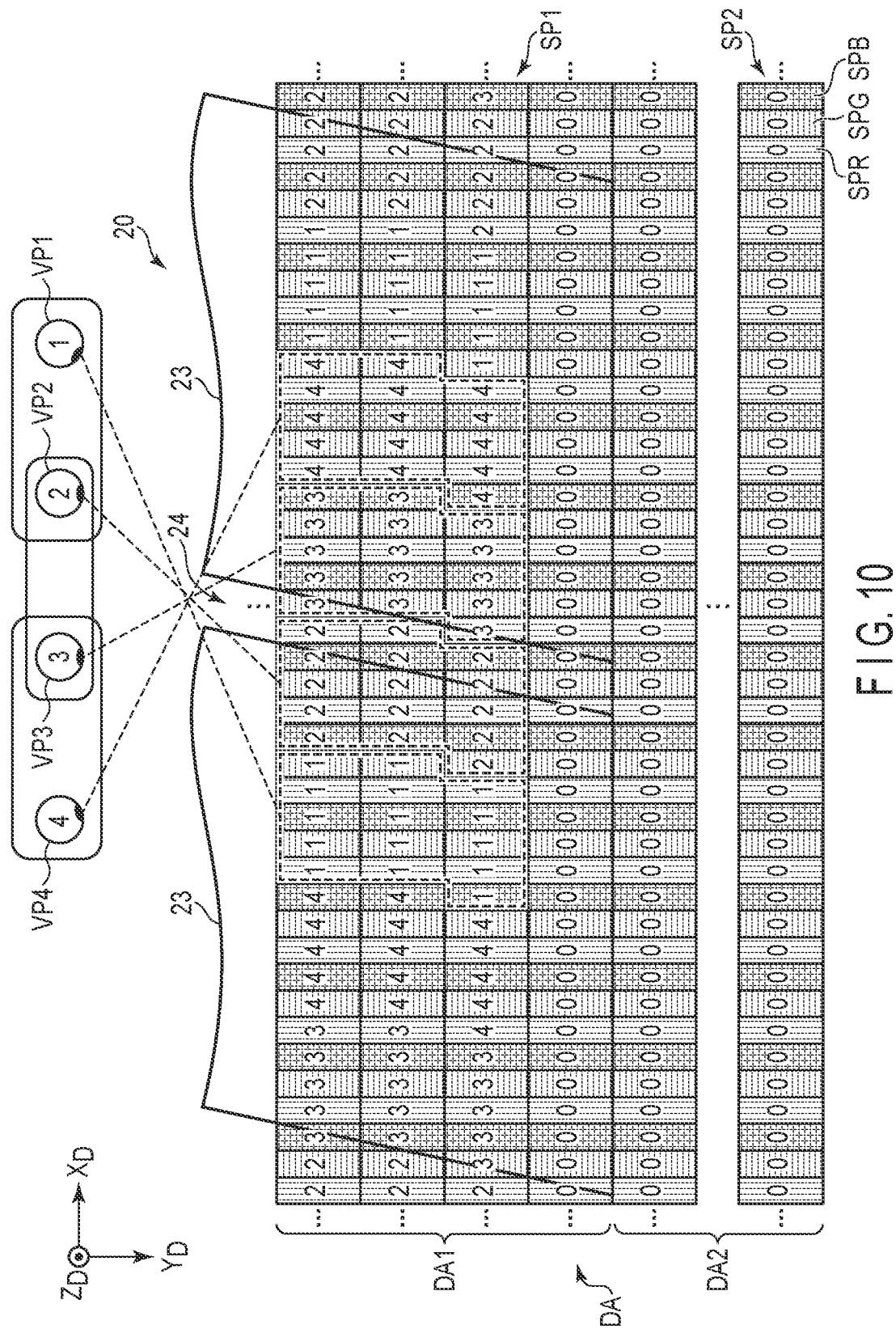
FIG. 10 is a view showing a third arrangement example of an image with respect to subpixels arranged in the display panel of the display of FIG. 3.

An image to be displayed using subpixels SP in the display area DA will be explained with reference to FIGS. 8 to 10. In the subpixels SP, a plurality of images corresponding to a plurality of view points by which a stereoscopic virtual image V1 (or image) is perceived by a user, and an image by which a planar virtual image V2 (or image) is perceived by a user at a predetermined depth position are displayed. The number of view points will be any natural integer of 2 or more. When the number of view points increases, a possibility that the virtual image to be perceived collapses becomes lower even if a user moves the eye sight.

Here, an example case will be explained, where a first image, a second image, third image and fourth image corresponding respectively to four view points VP1, VP2, VP3, and VP4 are used as a plurality of images corresponding to a plurality of view points for the user to be able to perceive the stereoscopic virtual image V1. The first image, second image, third image, and fourth image are images obtained when one scene (object) is captured from the first view point VP1, second view point VP2, third view point VP3, and fourth view point VP4, respectively. Furthermore, a zeroth image is used as an image of one view point by which the planar virtual image V2 is perceived by the user at a predetermined depth position.

The display area DA includes a first area DA1 in which the first to fourth images are displayed, and a second area DA2 in which the zeroth image is displayed. Note that, while the light control element 20 overlaps with the first area DA1, the light control element 20 does not overlap with the second area DA2. Each of the first to fourth images has the same resolution as the first area DA1, for example. The zeroth image has the same resolution as the second area DA2, for example.

Figure 8:
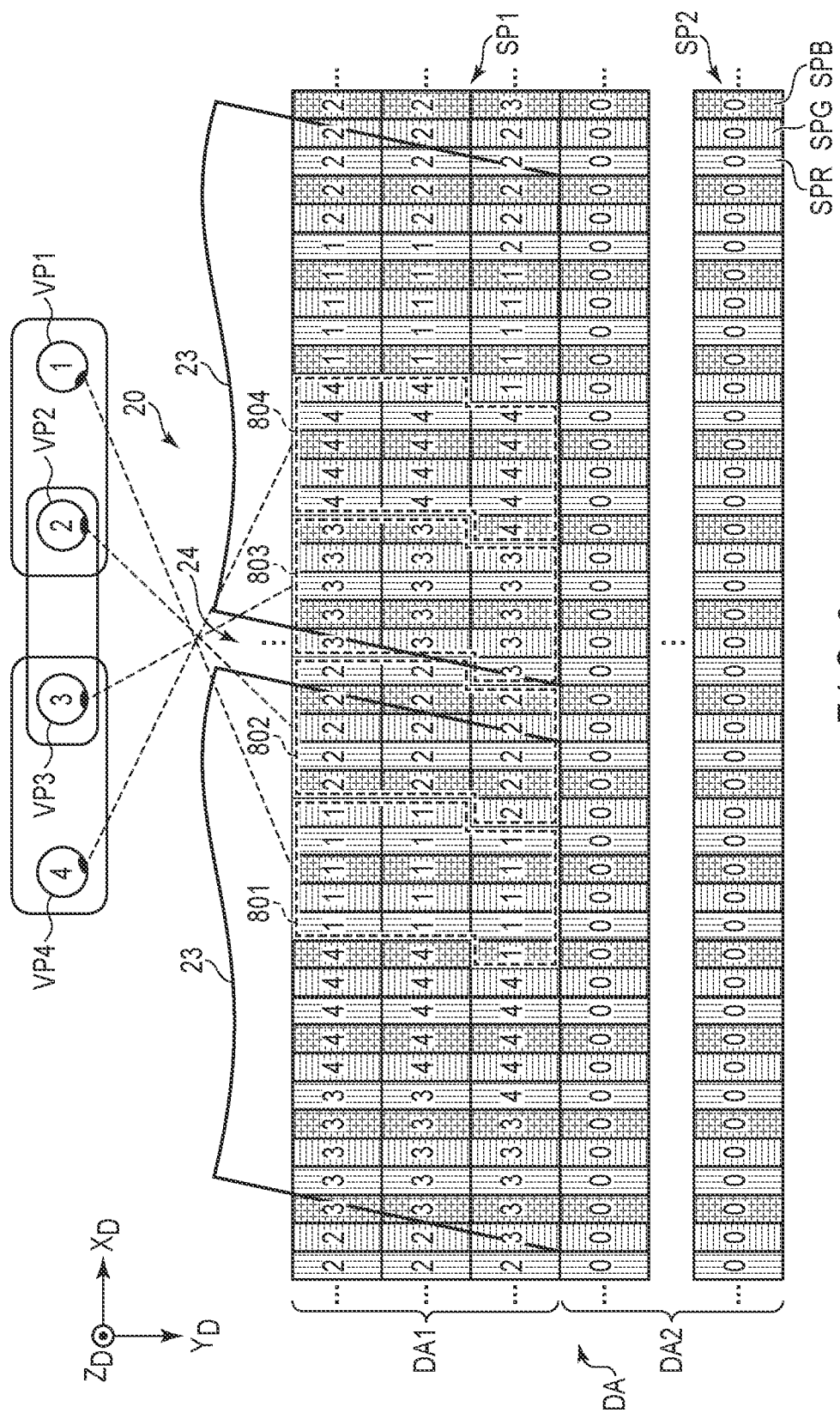
FIG. 8 is a view showing a first arrangement example of an image with respect to subpixels arranged in the display panel of the display of FIG. 3.

FIG. 8 shows an image to be displayed in each subpixel SP in the display area DA. In the area representing each subpixel SP, the number of the image part of which is displayed in the subpixel SP. In this example, if the image to be displayed is the first image, "1" is displayed in the area representing each subpixel SP, and similarly, if the image to be displayed is the second image, "2" is displayed therein, and if the image to be displayed is the third image, "3" is displayed therein, and if the image to be displayed is the fourth image, "4" is displayed therein, and if the image to be displayed is the zeroth image, "0" is displayed therein.

In the first area DA1, for example, four subpixels 801, 802, 803, and 804 are used to display parts of the first to fourth images corresponding to the four view points VP1, VP2, VP3, and VP4. The four subpixels 801, 802, 803, and 804 are arranged in the direction $X_D$ in this order. In each of the subpixels 801, 802, 803, and 804, for example, five subpixels are arranged in the direction $X_D$, and one to three subpixels are arranged in the direction $Y_D$.

The light beam emitted from the subpixels 801 passes through the opening 24 between two light shielding members 23 to reach the first view point VP1. Thus, the subpixels 801 is used to display a part of the first image corresponding to the first view point VP1. In the subpixels 801, a part of the first image corresponding to the position of the subpixels 801 in the first area DA1 is displayed.

The light beam emitted from the subpixels 802 passes through the opening 24 between two light shielding members 23 to reach the second view point VP2. Thus, the subpixels 802 is used to display a part of the second image corresponding to the second view point VP2. In the subpixels 802, a part of the second image corresponding to the position of the subpixels 802 in the first area DA1 is displayed.

The light beam emitted from the subpixels 803 passes through the opening 24 between two light shielding members 23 to reach the third view point VP3. Thus, the subpixels 803 is used to display a part of the third image corresponding to the third view point VP3. In the subpixels 803, a part of the third image corresponding to the position of the subpixels 803 in the first area DA1 is displayed.

Furthermore, the light beam emitted from the subpixels 804 passes through the opening 24 between two light shielding members 23 to reach the fourth view point VP4. Thus, the subpixels 804 is used to display a part of the fourth image corresponding to the fourth view point VP4. In the subpixels 804, a part of the fourth image corresponding to the position of the subpixels 804 in the first area DA1 is displayed.

In a similar manner to the aforementioned subpixels 801, 802, 803, and 804, which image is displayed will be determined in each subpixel SP1 in the first area DA1. Thus, in the first area DA1, parts of the four images corresponding to the four view points VP1, VP2, VP3, and VP4 are arranged in predetermined patterns in the direction $X_D$ and $Y_D$.

A user can perceive a stereoscopic virtual image V1 by the light beam emitted from the first area DA1 in the following cases, for example.

(1) Case where the light beam emitted from the subpixels 801 to the first view point VP1 is captured by the right eye while the light beam emitted from the subpixels 802 to the second view point VP2 is captured by the left eye.

(2) Case where the light beam emitted from the subpixels 802 to the second view point VP2 is captured by the right eye while the light beam emitted from the subpixels 803 to the third view point VP3 is captured by the left eye.

(3) Case where the light beam emitted from the subpixels 803 to the third view point VP3 is captured by the right eye while the light beam emitted from the subpixels 804 to the fourth view point VP4 is captured by the left eye.

As in the example of FIG. 8, the light beam emitted to a view point of certain number (for example, first view point VP1) is captured by the right eye while the light beam emitted to a view point of number which is greater than the certain number by one (for example, second view point VP2) is captured by the left eye, and thus, a stereoscopic virtual image can be perceived properly by a user.

As described above, the subpixels SP1 in the first area DA1 is divided to display the first to fourth images. Then, parts of the first to fourth images are displayed in the divided subpixels SP1. By the division, the resolution of each of the first to fourth images to be displayed becomes approximately ¼ the resolution of the first area DA1. Thus, in each of the view points VP1, VP2, VP3, and VP4, the resolution of the virtual image V1 to be perceived by the light beam emitted from the first area DA1 becomes as approximately ¼ the resolution of the display performance of the first area DA1, that is, the resolution is deteriorated.

Furthermore, the subpixels SP in the second area DA2 is used to display the zeroth image. In the subpixels SP in the second area DA2, the entirety of the zeroth image may be displayed, not a part of the zeroth image. Since the light control element 20 does not overlap with the second area DA2, the light beam emitted from the subpixels SP in the second area DA2 reaches to all the view points VP1, VP2, VP3, and VP4. Thus, in each of the view points VP1, VP2, VP3, and VP4, the resolution of the virtual image V2 to be perceived by the light beam emitted from the second area DA2 is the same as that of the second area DA2, that is, the resolution is not deteriorated. Thus, the image including characters, symbols, and the like, in which deterioration in resolution is not preferable will be displayed using the subpixels SP in the second area DA2. Thus, the corresponding virtual image V2 can be perceived by a user without lowering the visibility thereof.

To the display 2, display signals by which the subpixels SP in the display part DA display the zeroth image and parts of the first to fourth images in a layout of FIG. 8 will be input. The display 2 under the control according to the display signals displays the zeroth image and parts of the first to fourth images using the subpixels SP.

The display signals are generated by another information processor, and the like, and can be input to the display 2. Note that the display signals may be broadcast signals. In that case, the display 2 at least includes a communication device to receive display signals. Note that the display signals may be generated using a circuit such as processor in the display 2.

Onto the projection surface PS of the HUD 1 of FIG. 1, a plurality of images of a plurality of view points displayed using the first subpixels SP1 (for example, first to fourth images) are projected view the light control element 20 and the mirrors M1 and M2 while an image of one view point displayed using the second subpixels SP2 (for example, zeroth image) is projected via the mirrors M1 and M2.

The view point VP of the HUD 1 includes, specifically, a view point $VP_R$ of right eye of user and a view point $VP_L$ of left eye of user. For example, first light beam emitted from the subpixels SP1 in which an image (first image) is displayed in the first area DA1 and passing through the opening 24 reaches the view point $VP_R$ of right eye via the mirrors M1 and M2 and the projection surface PS. Second light beam emitted from the subpixels SP1 in which another image (for example, second image) is displayed in the first area DA1 and passing the opening 24 reaches the view point $VP_L$ of left eye via the mirrors M1 and M2 and the projection surface PS. Furthermore, third light beam emitted from the subpixels SP2 in the second area DA2 in which the zeroth image is displayed reaches the view points $VP_R$ and $VP_L$ via the mirrors M1 and M2 and the projection surface PS.

A user can perceive a stereoscopic virtual image V1 by capturing the first light beam with the right eye and capturing the second light beam with the left eye, and can perceive a planar virtual image V2 by capturing the third light beam by both eyes. That is, the user can perceive both the virtual image V1 corresponding to an image to be displayed with a deepness and the virtual image V2 corresponding to an image including characters, symbols, and the like, in which the deteriorating of the resolution is not preferable. Therefore, the display quality of the virtual images V formed in the HUD 1 can be improved.

Note that, in the proximity of the boundary of the first area DA1 and the second area DA2, the light control element 20 may not overlap a part of the first area DA1 while the light control element 20 may not overlap a part of the second area DA2 depending on the accuracy of assembly of the display panel 10 and the light control element 20, for example. In that case, the light beam emitted from each of the areas DA1 and DA2 may possibly be perceived in an unintentional view point.

Thus, as described above with reference to FIG. 5, subpixels SP1 of one or more rows in the first area DA1, which are closest to the boundary to the second area DA2 may be replaced with a black matrix BM2. In that case, as in FIG. 9, the part of the black matrix BM2 is not used for the display of the first to fourth images, and thus, even if the light control element 20 does not overlap with the subpixels SP1 of one or more rows, perception of an unintentional virtual image by a user can be avoided.

Furthermore, the zeroth image by which a planar virtual image V2 is perceived by a user may be displayed using the parts of the subpixels SP1 in the first area DA1 which is in the proximity of the subpixels SP2 in the second area DA2. For example, as in FIG. 10, the subpixels SP1 of one or more rows in the first area DA1 which are closest to the boundary with the second area DA2 may be used for the display of the zeroth image by which the planar virtual image V2 is perceived.

If the light control element 20 does not overlap with the subpixels SP1 of one or more rows, parts of the first to fourth images displayed using the subpixels SP1 are directly perceived by a user. That is, two images of different view points are not perceived by the right or left eye of the user, and the parts of the first to fourth images to be displayed are perceived by both eyes of the user. That is, a virtual image of unintentional contents will be perceived by the user.

In contrast, if a part of the zeroth image is displayed using the subpixels SP1 of one or more rows with which the light control element 20 does not overlap, the contents of the virtual image to be perceived (recognized) by a user does not change although the resolution of the virtual image to be perceived by the user is deteriorated. Thus, even if the light control element 20 does not overlap with the subpixels SP1 of one or more rows, perception of an unintentional image by a user can be avoided.

As above, even if the accuracy of assembly of the display panel 10 and the light control element 20 is low, or the like, the intentional virtual image V can be perceived by a user, and an affect on the visibility of the user can be reduced.

Figure 11:
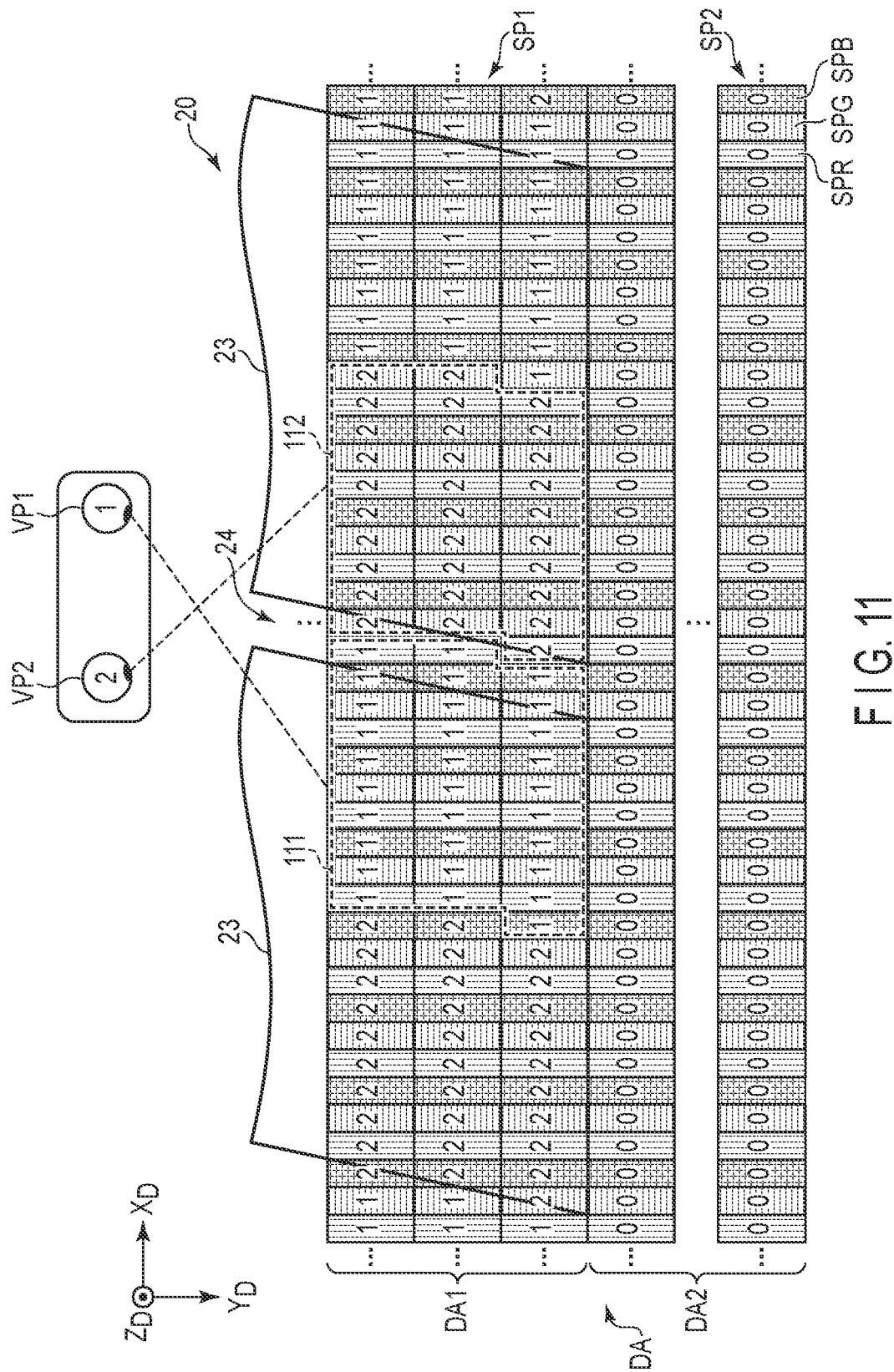
FIG. 11 is a view showing a fourth arrangement example of an image with respect to subpixels arranged in the display panel of the display of FIG. 3.

FIG. 11 shows another example where which image is to be displayed in the subpixels SP in the display area DA. In this example, a first image and a second image corresponding to two view points VP1 and VP2, respectively, are used as a plurality of images corresponding to a plurality of view points by which a stereoscopic image V1 (or image) is perceived by a user. The first image and the second image are images obtained when one scene is captured from the first view point VP1 and the second view point VP2. Furthermore, a zeroth image is used as an image of one view point by which a planar virtual image V2 at a predetermined depth position is perceived by a user.

The display area DA includes a first area DA1 in which the first image or the second image is displayed and a second area DA2 in which the zeroth image is displayed. While the light control element 20 overlaps with the first area DA1, the light control element 20 does not overlap with the second area DA2. Each of the first and second images has, for example, the same resolution as the first area DA1. The zeroth image has, for example, the same resolution as the second area DA2.

In the first area DA1, for example, parts of the first and second images corresponding to the two view points VP1 and VP2 using two subpixels 111 and 112 are displayed. The two subpixels 111 and 112 are arranged in this order in the direction $X_D$. For example, in the subpixels 111 and 112, ten subpixels are arranged in the direction $X_D$, and one to three subpixels are arranged in the direction $Y_D$.

The light beam emitted from the subpixels 111 passes through the opening 24 between two light shielding members 23 to reach the first view point VP1. Thus, the subpixels 111 is used to display a part of the first image corresponding to the first view point VP1. In the subpixels 111, a part of the first image corresponding to the position of the subpixels 111 in the first area DA1 is displayed.

Furthermore, the light beam emitted from the subpixels 112 passes through the opening 24 between two light shielding members 23 to reach the second view point VP2. Thus, the subpixels 112 is used to display a part of the second image corresponding to the second view point VP2. In the subpixels 112, a part of the second image corresponding to the position of the subpixels 112 in the first area DA1 is displayed.

In the first area DA1, as with the aforementioned subpixels 111 and 112, which image is displayed in each subpixel SP1 will be determined. Thus, in the first area DA1, a part of two images corresponding to two view points VP1 and VP2 is arranged in the directions $X_D$ and $Y_D$ in a predetermined pattern.

A user can perceive a clearer stereoscopic virtual image V1 based on the light beam emitted from the first area DA1 when capturing the light beam emitted to the first view point VP1 with the right eye and capturing the light beam emitted to the second view point VP2 with the left eye.

As described above, the subpixels SP1 in the first area DA1 is divided to display the first and second images. The first and second images are partially displayed in the divided subpixels SP1. By the division, the resolution of each of the first and second images to be displayed becomes approximately ½ the resolution of the first area DA1. Thus, in each of the view points VP1 and VP2, the resolution of the virtual image V1 to be perceived through the light beam emitted from the first area DA1 becomes approximately ½ the resolution of the display performance of the first area DA1, that is, the resolution is deteriorated.

Furthermore, the subpixels SP2 in the second area DA2 is used to display the zeroth image. In the subpixels SP2 in the second area DA2, the entirety of the zeroth image will be displayed, not a part of the zeroth image. The light control element 20 does not overlap with the second area DA2, and thus, the light beam emitted from the subpixels SP2 in the second area DA2 reaches both the view points VP1 and VP2. Thus, in the view points VP1 and VP2, the resolution of the virtual image V2 to be perceived through the light beam emitted from the second area DA2 is the same as that of the second area DA2, that is, the resolution is not deteriorated. Thus, an image including characters, symbols, and the like, in which deterioration in resolution is not preferable is displayed using the subpixels SP2 in the second area DA2 in order that a user can perceive the corresponding virtual image V2 without lowering the visibility thereof.

To the display 2, display signals by which the subpixels SP in the display area DA display the zeroth image and parts of the first and second images in a layout as in FIG. 11 are input. The display 2 under the control according to the display signals displays the zeroth image and parts of the first and second images using the subpixels SP.

As described above, the view point VP of the HUD 1 of FIG. 1 includes the view point $VP_R$ for the right eye of user, and the view point $VP_L$ for the left eye of user. The first light beam emitted from the subpixels SP1 in which the first image of the first area DA1 is displayed and passes through the opening 24 reaches the view point $VP_R$ of the right eye via the mirrors M1 and M2 and the projection surface PS. The second light beam emitted from the subpixels SP1 in which the second image of the first area DA1 is displayed and passes through the opening 24 reaches the view point $VP_L$ of the left eye via the mirrors M1 and M2 and the projection surface PS. Furthermore, the third light beam emitted from the subpixels SP2 in the second area DA2 in which the zeroth image is displayed reaches the two view points $VP_R$ and $VP_L$ via the mirrors M1 and M2 and the projection surface PS.

The user captures the first light beam with the right eye and the second light beam with the left eye to perceive a stereoscopic virtual image V1, and also, the user captures the third light beam with both eyes to perceive a planar virtual image V2. That is, the user can perceive both the virtual image V1 corresponding to an image, which should preferably be obtained with a deepness and the virtual image V2 corresponding to an image including characters, symbols, and the like, in which the deteriorating of the resolution is not preferable. Therefore, the display quality of the virtual images V formed in the HUD1 can be improved.

Note that in the case where the first and second images of two view points are displayed in the first area DA1 as well, a modified structure can be applied to the vicinity of the boundary between the first area DA1 and the second area DA2, which is described above with reference to FIGS. 9 and 10.

As described above, according to the present embodiment, the display quality of the virtual images can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device obtained from the configuration disclosed in this specification will be additionally noted.

(1) A display device comprising:
a display area including subpixels arranged in a first direction and a second direction which is orthogonal to the first direction, and including a first area containing first subpixels in the subpixels and a second area containing second subpixels in the subpixels;
a light control element that is overlapped with the first area;
a projection surface on which an image displayed in the display area is projected; and
at least one of one or more mirrors or one or more lenses for projecting the image on the projection surface, wherein
a virtual image perceived by a user who views the projection surface includes a first virtual image corresponding to the first area and perceived as a stereoscopic virtual image, and a second virtual image corresponding to the second area and perceived as a planar virtual image.

(2) The display device of item 1, wherein the virtual image includes, with respect to the user, the first virtual image in an upper part and the second virtual image in a lower part.

(3) The display device of item 1, wherein the display area includes a first light shielding member in a third area in the first area, which contacts the second area.

(4) The display device of item 3, wherein the light control element further includes a second light shielding member overlapping the first light shielding member.

(5) The display device of item 1, wherein the display area further displays, using a part of the first subpixels which is in the proximity of the second subpixels, an image by which the user can perceive the planar virtual image.

(6) The display device of item 1, wherein
the second virtual image is perceived by the user in a first depth position, and
the first virtual image is perceived by the user in a range between a second depth position and a third depth position.

(7) The display device of item 6, wherein the range includes the first depth position.

(8) The display device of item 6, wherein the first depth position is a position closer to a view point of the user than is the range.

(9) The display device of item 1, wherein
the first subpixels includes a plurality of subpixels each displaying a plurality of images of a plurality of view points, by which the user can perceive the stereoscopic virtual image, and
the second subpixels displays an image of one view point by which the user can perceive the planar virtual image.

(10) The display device of item 1, wherein, a plurality of images of a plurality of view points displayed using the first subpixels are projected onto the projection surface via the light control element, and an image of one view point displayed using the second subpixels is projected onto the projection surface.

(11) A display device comprising:
a first display area and a second display area having pixels arranged in a matrix;
a light control element, which displays a three-dimensional image, being overlapped with the first display area and not overlapped with the second display area; and
a projection surface on which the three-dimensional image displayed on the first display area and a two-dimensional image displayed on the second display area being projected.

What is claimed is:
1. A display device comprising:
a display area including subpixels arranged in a first direction and a second direction which is orthogonal to the first direction, and including a first area containing first subpixels in the subpixels and a second area containing second subpixels in the subpixels;
a light control element that is overlapped with the first area and is not overlapped with the second area;
a projection surface on which an image displayed in the display area is projected; and
at least one of one or more mirrors or one or more lenses for projecting the image on the projection surface, wherein
a virtual image perceived by a user who views the projection surface includes a first virtual image corresponding to the first area and perceived as a stereoscopic virtual image, and a second virtual image corresponding to the second area and perceived as a planar virtual image,
the display device comprises a peripheral part and a light shielding member, the light shielding member arranged between a predetermined first subpixels constituting the first subpixels and a predetermined second subpixels constituting the second subpixels,
the first area includes a third area capable of including one or more lines of the first subpixels, the third area being between a line of the first subpixels closest to the second area and the second area, and
a part of the light shielding member and a first light shielding member are arranged over a surface of the third area.

2. The display device of claim 1, wherein the virtual image includes, with respect to the user, the first virtual image in an upper part and the second virtual image in a lower part.

3. The display device of claim 1, wherein the light control element further includes a second light shielding member overlapping the first light shielding member.

4. The display device of claim 1, wherein
the second virtual image is perceived by the user in a first depth position, and
the first virtual image is perceived by the user in a range between a second depth position and a third depth position.

5. The display device of claim 4, wherein the range includes the first depth position.

6. The display device of claim 4, wherein the first depth position is a position closer to a view point of the user than is the range.

7. The display device of claim 1, wherein
the first subpixels includes a plurality of subpixels each displaying a plurality of images of a plurality of view points, by which the user can perceive the stereoscopic virtual image, and
the second subpixels displays an image of one view point by which the user can perceive the planar virtual image.

8. The display device of claim 1, wherein, a plurality of images of a plurality of view points displayed using the first subpixels are projected onto the projection surface via the light control element, and an image of one view point displayed using the second subpixels is projected onto the projection surface.

* * * * *